Aug. 6, 1968   D. G. FAWKES   3,395,886
KNURLED SLEEVE CONNECTOR FOR SPECIAL OPERATOR TO VALVE
Filed June 18, 1965   2 Sheets-Sheet 1

Inventor:
Donald G. Fawkes
By: Hofgren, Wegner, Allen,
Stellman & McCord
Attorneys Aug. 6, 1968   D. G. FAWKES   3,395,886
KNURLED SLEEVE CONNECTOR FOR SPECIAL OPERATOR TO VALVE
Filed June 18, 1965   2 Sheets-Sheet 2
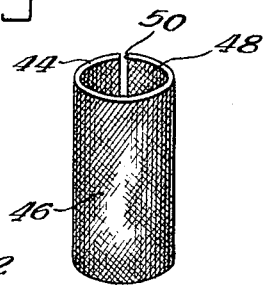
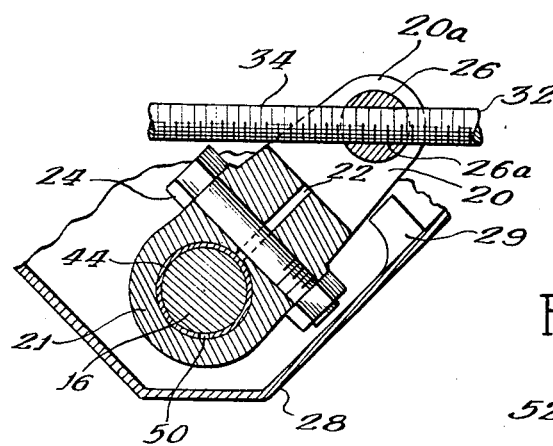
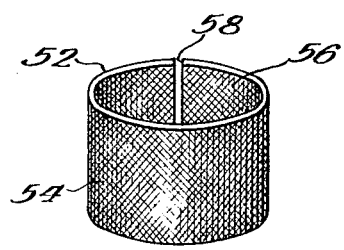
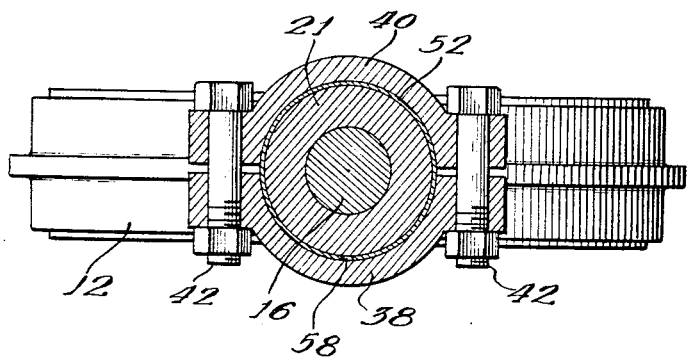

United States Patent Office 3,395,886
Patented Aug. 6, 1968

3,395,886
KNURLED SLEEVE CONNECTOR FOR SPECIAL OPERATOR TO VALVE
Donald G. Fawkes, Chicago, Ill., assignor to Henry Pratt Company, a corporation of Illinois
Filed June 18, 1965, Ser. No. 464,962
6 Claims. (Cl. 251—229)

ABSTRACT OF THE DISCLOSURE

An infinitely adjustable keying structure for connecting a valve operator to a valve for accurately positioning the valve selectively in the closed and opened positions corresponding to limits of movement of the valve operator.

---

This invention relates to keying means for rigidly securing valve operators to valves.

The use of butterfly valves in large conduits such as water mains, pipe lines, etc., has heretofore used mechanical operators due to the amount of torque needed to open and close the valves. Because of the large size of such valves, it has been found to be necessary to use a valve operator having a high mechanical advantage or sufficient thrust for effectively moving the disc member of the valve between its open and closed positions. Customarily, movement of the valve operator, and thus the disc member, has been limited by suitable stop means requiring that the valve operator be accurately angularly associated with the disc member. Any slight misalignment in such a structure could cause the disc member either to stop short of the closed position or move somewhat past the closed position and thereby slightly open the valve. Most operators have had a key and slot mechanical connection requiring expensive and very accurate jigs to properly locate all the parts of the valve and operator.

This problem is aggravated by the difficulty of accurate connection of the valve operator to the valve body, as any slight angular misalignment in this connection may similarly present a serious leakage problem.

Conventional methods of keying the valve operator to the disc member and the valve body have not satisfactorily eliminated the problem. The tolerances of the keyway dimensions alone permit such misalignment and resultant flow. Slight errors in the angular position of the keyways on the respective elements may also produce such misalignment.

It is, therefore, a principal object of the invention to provide new and improved means for connecting a valve operator to a valve.

Another object of the invention is the provision of such means including new and improved means for keying a valve operator to a valve.

Still another object of the invention is the provision of such means for keying a valve operator to a valve arranged to withstand high torques and shear stresses.

A further object of the invention is the provision of such means for use between a valve and a valve operator having positive gripping surfaces for positively interlocking with the valve and the valve operator.

Another object of the invention is the provision in valve mechanisms of such connecting means having biting surfaces that are harder than the surfaces of the valve mechanism with which they come in contact to form a positive, keyed connection accurately interlocking the parts of the valve mechanism connected thereby.

Yet another object of the invention is the provision in valve mechanisms of such keying means comprising a sleeve having knurling on its internal and external surfaces.

Other objects and advantages of the invention will be apparent from the following description taken in connection with the acompanying drawings in which:

FIGURE 3 is a fragmentary horizontal section taken substantially along the line 3—3 of FIGURE 1;

FIGURE 4 is a fragmentary horizontal section taken substantially along the line 4—4 of FIGURE 1;

FIGURE 5 is an isometric view of a keying means embodying the invention; and

FIGURE 6 is an isometric view of the keying means shown in section in FIGURE 4.

Figure 2:
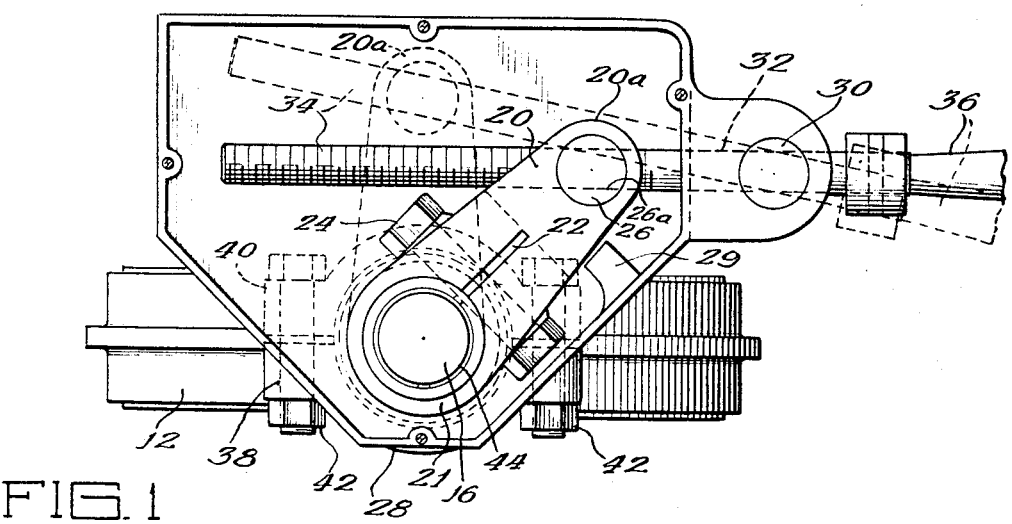
FIGURE 2 is a horizontal section thereof taken substantially along the line 2—2 of FIGURE 1.

In the exemplary embodiment of the invention as disclosed in the drawing, a butterfly valve and operator assembly, generally designated 10, is shown to include a valve body 12 having a sealing or disc member 14 carried therein on a stem shaft 16. Shaft 16 is journalled for rotation in diametrically opposed hubs 18 in the valve body 12. Suitable packing 19 is provided betwen the shaft 16 and the hubs 18 to preclude leakage therebetween.

About the outer extremity of the shaft 16 is a lever 20, having a bifurcated yoke portion 21 surrounding the shaft or valve stem 16. Yoke portion 21 is further provided with a slot 22 to permit tightening of the lever portion 21 about the shaft 16 by means of a clamping screw 24. A pin 26 is journalled for rotation about an axis parallel to the axis of rotation of shaft 16 within the opposite end 20a of the lever 20 and is provided with a diametric, internally threaded bore 26a.

A housing 28 is mounted on valve body 12 for housing the lever 20. A bearing 30 is mounted in housing 28 for rotation about an axis parallel to the axis of rotation of shaft 16 and pin 26 and journals an operator screw 32 having a threaded end portion 34 threaded in bore 26a of pin 26, as seen in FIGURES 2 and 3. Bearing 30 is arranged to retain the screw 32 against longitudinal movement while allowing free rotation thereof. Thus, when screw 32 is rotated about its axis, the end 20a of lever 20 travels along the threaded end portion 34 thereby rotating the valve shaft 16. Screw 32 may be rotated by a suitable crank 36, it being obvious that other suitable moving means such as reversible motors or the like may be used. Suitable conventional stop means 29 are provided within the housing to stop the lever 20 at an accurately predetermined limit of travel.

Housing 28 includes depending clamp portions 38 and 40 for clamped attachment to the valve body hub 18. Screws 42 are provided for suitably clamping portions 38 and 40 about the hub 18, as shown in FIGURE 4.

Figure 1:
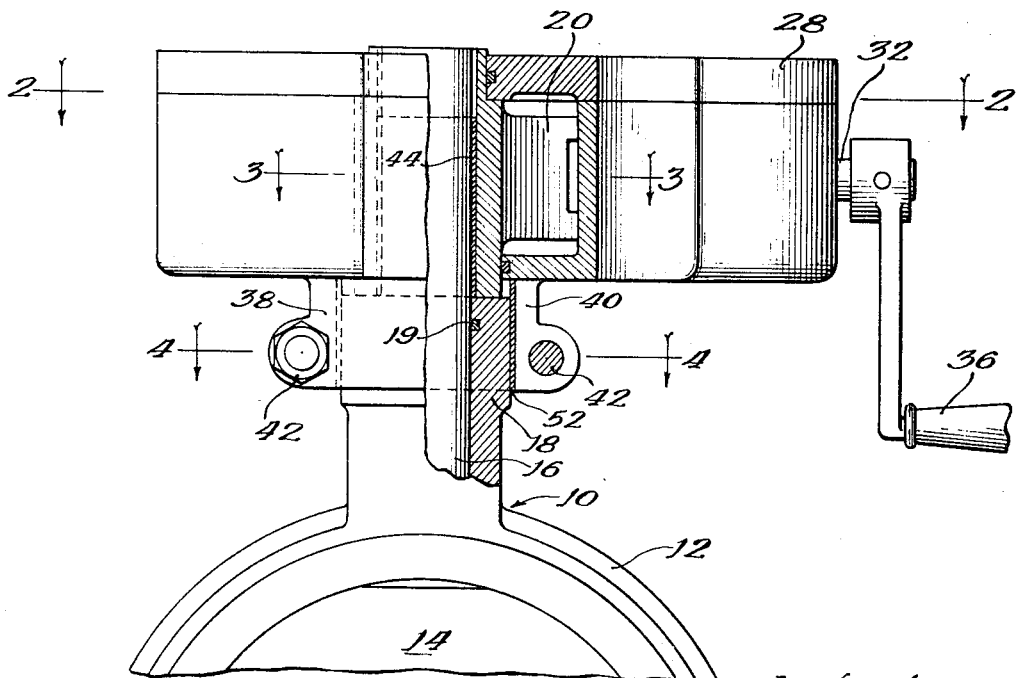
FIGURE 1 is a fragmentary front elevation of a valve having a connecting means embodying the invention.

As seen in FIGURES 1 and 3, a tubular connector, herein a split sleeve 44, is interposed between the valve shaft 16 and the yoke portion 21 of lever 20. The outer cylindrical surface 46 and the inner cylindrical surface 48 of sleeve 40 are preferably knurled. A longitudinal slot 50 runs the length of the sleeve 44 permitting suitable constriction of the sleeve about the shaft 16 whereby the inner surface 48 positively interlocks with the outer surface of the valve shaft 16. A similar sleeve 52, as shown in FIGURE 6, is interposed between upper hub 18 and the clamp portions 38 and 40 of the housing 28, as seen in FIGURES 1 and 4. Sleeve 52 includes an outer knurled surface 54 and an inner knurled surface 56, and is longitudinally slit at 58.

Sleeves 44 and 52 may be formed from a sheet of suitable metal by knurling both sides and then forming the knurled sheet into a suitable cylinder. The knurled surfaces are preferably relatively hard as compared to the metal of the lever 20, shaft 16, hubs 18 and clamp portions 38 and 40 (for example, at least approximately ten units on the Rockwell C-scale hardness). Thus, when the sleeves 44 and 52 are suitably positioned in the assembly 10 and pressure is applied by the clamping screws 24 and 42, the knurled surfaces bite into the softer confronting metal surfaces and form a rigid keyed connection therebetween. As will be obvious to those skilled in the art, the desired hardness of the sleeves may be provided as desired by case hardening, by through-hardening the entire sleeve, or by other suitable hardening processes.

Proper alignment between the parts may be effected as follows: assembly 10 may be arranged as shown in the drawing prior to the application of clamping pressure by means of the clamping screws 24 and 42. The disc member 14 is then accurately arranged in its closed position with respect to the valve body 12. Pin 26 is then accurately adjusted on the threaded portion 34 of the screw 32 such that the lever 20 positively abuts the stop means 29. Housing 28 is then turned to the desired orientation on valve body 12. Screws 42 are then tightened, thereby positively securing housing 28 to the valve body 12 by virtue of the positive biting of the knurled surfaces of the sleeve 52 into the softer metal of clamp portions 38 and 40 and hubs 18. Disc member 14 is disposed in the valve-closed position, and lever 20 is accurately disposed at its limit of travel as a result of the abutment thereof with stop means 29. Screws 24 are now tightened to secure the lever 20 accurately in this selected position on shaft 16, the connection therebetween being positive by virtue of the biting of the knurled surfaces of the sleeve 44 into the metal of lever 20 and shaft 16.

It will be apparent from the foregoing that the use of keying means embodying the invention results in a connection that is able to withstand high torques and shear stresses, substantially above those to which conventional keying means are limited. In the present keying means, keying takes place over substantially the entire extent of the confronting surfaces of the elements being connected. Furthermore, as the knurled sleeves effectively form their own keyways during the clamping process, the vexatious problem of maintaining low tolerances in cutting keyways is completely obviated. Finally, since the parts are accurately aligned while the clamping pressure and rigidity of the connection is effected, angular misalignment of the elements is precluded.

It will be appreciated that while the exemplary embodiment disclosed above has been described as having generally metallic parts, that other materials, such as suitable plastics having the requisite characteristics, may be employed in fabricating certain of the various elements.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. For use in a butterfly valve having a hollow valve body and a disc member, a stem carrying said disc member journalled for rotation on said valve body, and having a portion protruding from said body, an arm, first clamping means on said arm, a housing having a portion surrounding said arm and said portion of the stem protruding from said valve body, second clamping means associated with said housing for securing a rigid connection between said housing and said valve body, and operating means affixed to and at least partially within said housing for rotating said arm, said stem and said disc member, means for connecting said stem to said arm and said valve body to said housing portion comprising:

a first internally and externally knurled cylindrical sleeve clamped between said stem and said arm by said first clamping means; and a second internally and externally knurled cylindrical sleeve clamped between said valve body and said housing portion by said second clamping means, at least the knurled surface portions of said first and second sleeves being harder than said arm, said stem, said valve body, and said housing portion, respectively, each of said sleeves having a longitudinal slot to permit said sleeves to positively interlock the portions between which they are clamped.

2. For use in a butterfly valve having a hollow valve body and a disc member, a stem carrying said disc member in said hollow valve body for movement between valve-open and valve-closed positions, means journalling said stem in said valve body, a connector arm having clamping means, and operating means for moving said arm, connecting means comprising a one-piece, split right cylindrical sleeve defining a connector member, said connector member being knurled over substantially its entire internal and external cylindrical surfaces and being clamped by said clamping means onto said stem for positively interlocking said stem and said connector arm, the knurled surface portions of said connector member being harder than said arm and said stem to cut into said arm and said stem as a result of being clamped therebetween thereby forming interlocking keyways in said stem and said arm.

3. The butterfly valve of claim 2 wherein said stem includes a portion protruding from said body and clamping means are provided on said arm for making a rigid connection between said arm and said protruding portion of said stem.

4. For use in a butterfly valve having a hollow valve body provided with a hub, a disc member, a stem carrying said disc member in said hollow valve body for movement between valve-open and valve-closed positions, said stem being journalled for rotation in said hub, an arm on said stem, a housing having a portion surrounding said arm and said hub on said valve body, clamping means associated with said housing portion for securing a rigid connection between said housing portion and said hub, and operating means affixed to and at least partially within said housing for rotating said arm, said stem and said disc member, an internally and externally knurled sleeve clamped between said hub and said housing portion by said clamping means, at least the knurled portions of said sleeve bieng harder than said hub and said housing portion to cut into said hub and said housing portion as a result of being clamped therebetween, thereby forming positively interlocking keyways in said hub and said housing portion.

5. The butterfly valve of claim 4 wherein said sleeve includes a longitudinal slot to permit said sleeve to snugly abut said hub.

6. For use in a butterfly valve having a hollow valve body provided with a hub and a disc member, a stem carrying said disc member in said hollow valve body for movement between valve-open and valve-closed positions, means journalling said stem for rotation in said hub, an arm, first clamping means on said arm for making a rigid connection between said arm and said stem, a housing having a portion surrounding said arm and said hub, second clamping means associated with said housing for securing a rigid connection between said housing and said hub, and operating means affixed to and at least partially within said housing for rotating said arm, said stem and said disc member, a first knurled sleeve clamped between said stem and said arm by said first clamping means, and a second knurled sleeve clamped between said portion of said housing and said hub by said second clamping means.

References Cited

UNITED STATES PATENTS

| | | | |
|---|---|---|---|
| 404,824 | 6/1889 | Clark et al. | 251—52.04 |
| 3,043,160 | 7/1962 | Killian | 251—229 |

FOREIGN PATENTS

| | | |
|---|---|---|
| 14,220 | 10/1902 | Great Britain. |
| 253,122 | 7/1964 | Great Britain. |
| 715,441 | 9/1954 | Great Britain. |

WILLIAM F. O'DEA, *Primary Examiner.*

D. R. MATTHEWS, *Assistant Examiner.*